Oct. 4, 1966

L. E. REDMAN 3,276,845

APPARATUS FOR COMPOSTING WASTE MATERIALS

Filed Nov. 30, 1962

INVENTOR.
LAWRENCE E. REDMAN
BY
Kemon, Palmer, Stewart & Estabrook
ATTORNEYS

Oct. 4, 1966  L. E. REDMAN  3,276,845
APPARATUS FOR COMPOSTING WASTE MATERIALS
Filed Nov. 30, 1962  4 Sheets-Sheet 2

INVENTOR.
LAWRENCE E. REDMAN
BY
Kenyon, Palmer, Stewart & Estabrook
ATTORNEYS

Oct. 4, 1966   L. E. REDMAN   3,276,845
APPARATUS FOR COMPOSTING WASTE MATERIALS
Filed Nov. 30, 1962   4 Sheets-Sheet 3
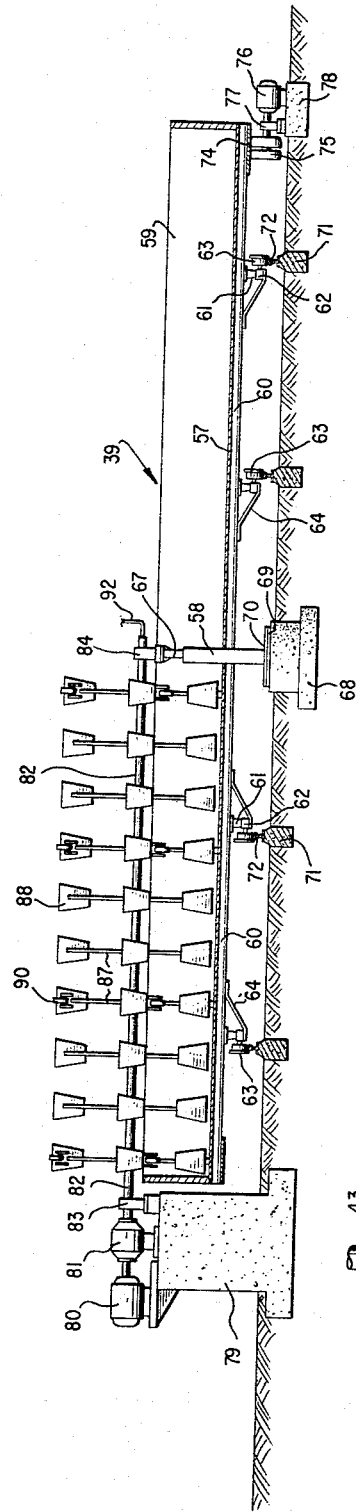
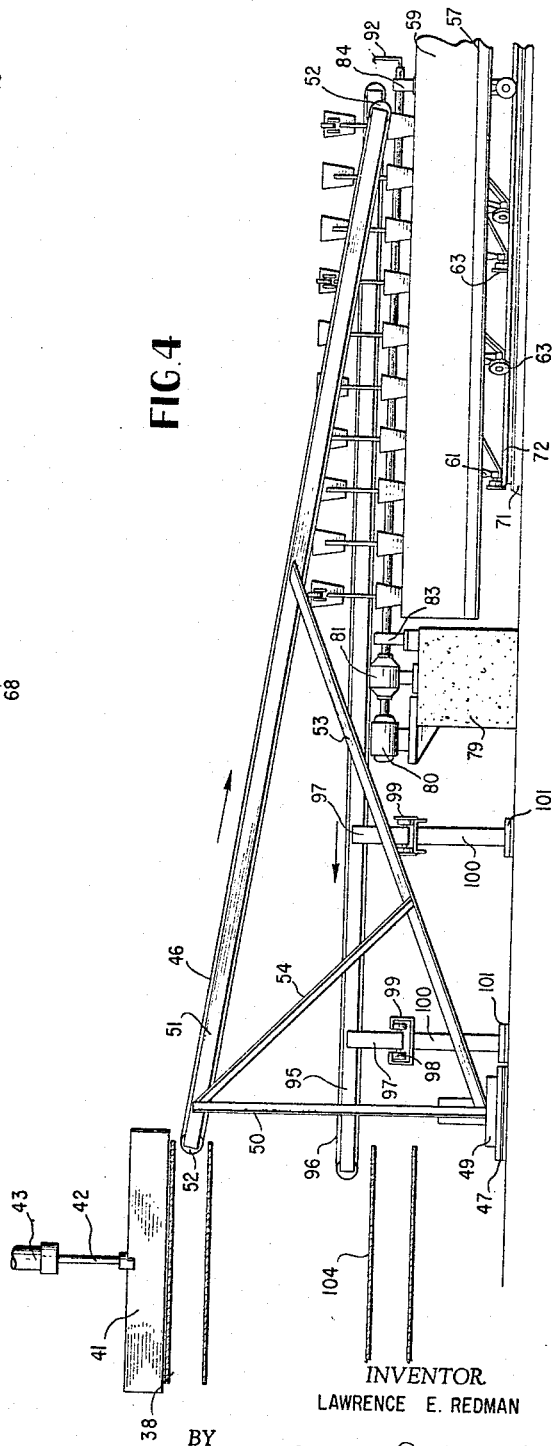
FIG. 3
FIG. 4
INVENTOR.
LAWRENCE E. REDMAN
BY
Kemon, Palmer, Stewart & Estabrook
ATTORNEYS

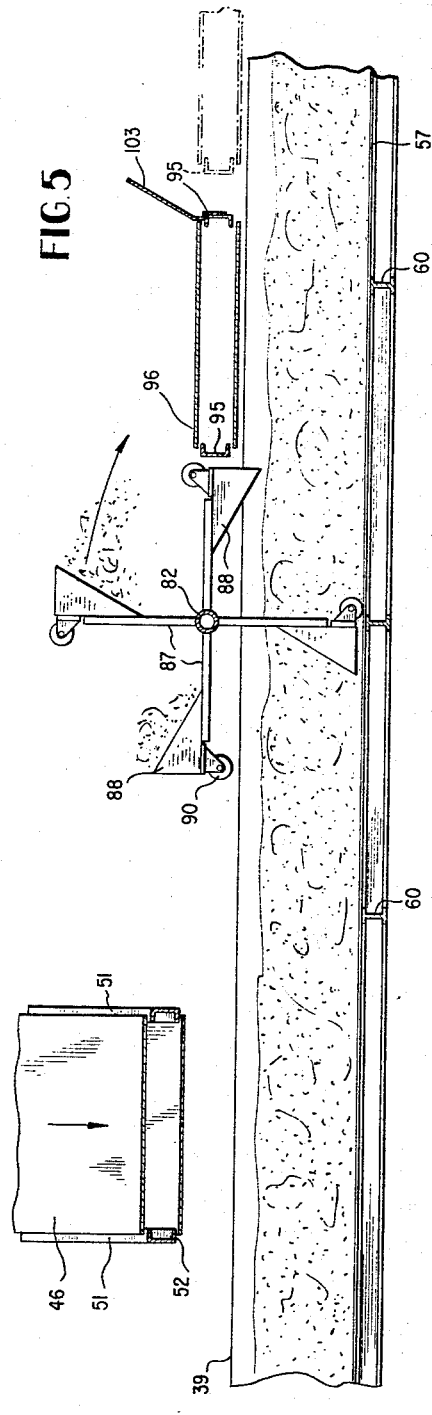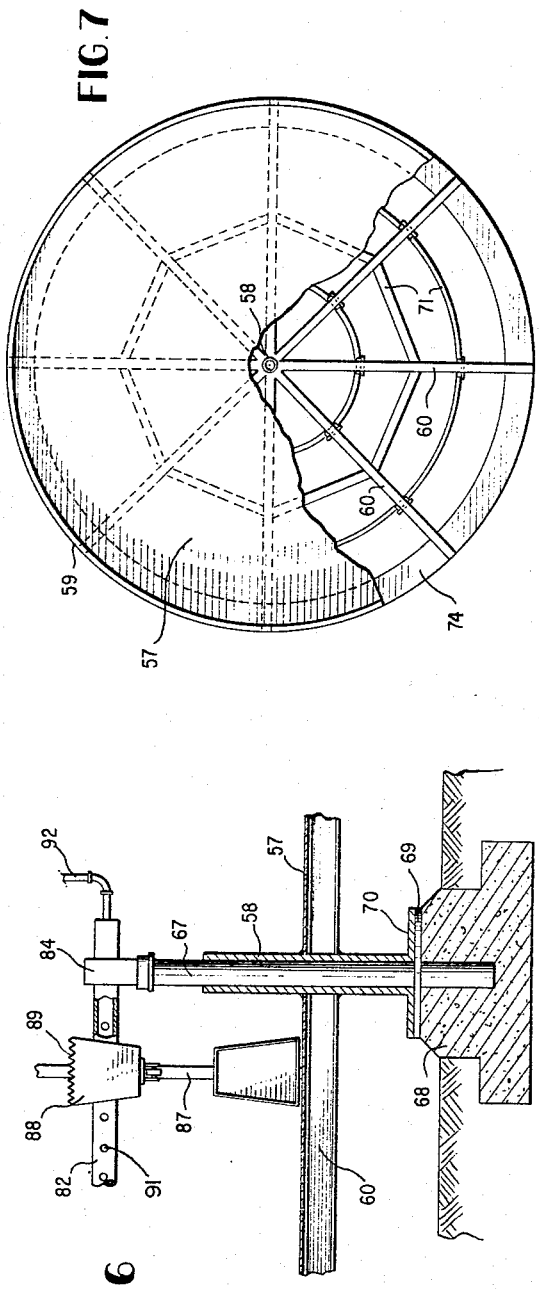

United States Patent Office 3,276,845
Patented Oct. 4, 1966

3,276,845
APPARATUS FOR COMPOSTING WASTE
MATERIALS
Lawrence E. Redman, Phoenix, Ariz., assignor to Garbage Service Company, Inc., Phoenix, Ariz., a corporation of Arizona
Filed Nov. 30, 1962, Ser. No. 241,205
8 Claims. (Cl. 23—259.3)

This invention relates to an improved method and apparatus for composting waste materials containing organic and inorganic constituents such as municipal refuse and the like.

In certain areas efforts have recently been directed towards the disposal of municipal refuse and the like by various processes for the purpose of treating said refuse material whereby a humus or soil nutrient could be obtained as an end product which would be saleable as such. It has been found, however, that in carrying out certain of the processes, the apparatus employed has not been entirely satisfactory. In some instances, the apparatus employed has produced very obnoxious odors while other installations have utilized equipment that is so complex and complicated as to be continuously in a state of repair. In other instances, it has been determined that the apparatus employed in carrying out the desired process has operated so inefficiently as to result in a prohibitive operating cost. It is essential in an operation involving municipal refuse and waste material that the apparatus for processing same be one that is relatively simple in design and capable of continuous operation. The reason being that said refuse and waste material will be delivered to said apparatus at regularly scheduled intervals and for sanitary reasons alone said apparatus and equipment must be capable of receiving and processing said material.

The apparatus of the present invention is regarded as constituting an advancement in the art of composting waste material by an aerobic process. The said apparatus, while consisting of relatively few moving parts, is definitely a variation from previously known structures or devices wherein the material to be composted was retained in a substantially stationary or dormant condition for a prescribed period of time. Such a condition did not permit proper and complete fermentation of the material to be composted so that an inferior end product was usually obtained.

The present invention is directed to an apparatus for carrying out a process which appears to be somewhat at a variance with processes previously employed in the composting of waste material. The present process of composting waste material and the apparatus employed therefor are predicated upon the premise that said waste material should be thoroughly agitated during various stages of its fermentation and that said agitation should take the form of mixing or stirring the waste material in such a manner as to bring or present new or different areas of the material to the atmosphere so as to enhance aid and abet the fermentation of said material. In addition, the apparatus of the present invention is designed to carry out the process of introducing water or other suitable liquids to the waste material during the fermentation thereof for the purpose of aiding and abetting the fermentation as well as controlling and maintaining the temperature of the material within certain desired ranges during the fermentation period.

One of the objects of the present invention is to compost waste material by a process wherein said material is thoroughly pulverized and then mixed and moistened for initiating fermentation thereof prior to its delivery to a digester chamber.

Another object is to provide an apparatus for composting waste materials which are pre-treated and then delivered to a chamber or container which is continuously open to the atmosphere and where said materials are retained for a prescribed period of time to produce a humus or soil nutrient product.

Another object is to provide an apparatus having a rotating chamber or container for receiving waste material that has been thoroughly pulverized, mixed, and moistened and which material is then subjected to agitation by blade-like members moving in a direction contrary to the movement of said container for insuring a thorough fermentation of said material.

Another object is to provide an apparatus having means for delivering waste material that has been pre-treated to initiate fermentation to an open topped rotating chamber or container where the material is periodically agitated and moistened and wherein additional means are provided for receiving from said container a humus or soil nutrient product that has been derived from the fermentation and treatment of said waste materials within said container.

Another object is to provide an apparatus for the composting of waste material which is highly efficient in operation, economical of manufacture, and which is capable of continuous operation for composting said material within a relatively short period of time.

Other objects and advantages, more or less ancillary to the foregoing in the manner in which all of the objects are realized, will appear in the following description, which when considered in connection with the accompanying drawings sets forth the preferred embodiment of the invention.

Referring to the drawings wherein the preferred embodiment of the invention is illustrated:

FIGURE 3 is a vertical sectional view of one of the digester chambers showing the mounting of said chamber for rotative movement and with the agitating means positioned therein;

FIGURE 4 is a vertical sectional view of the disclosure of FIG. 2 showing a portion of one of the digester chambers with the loading and unloading conveyors associated therewith;

FIGURE 5 is a detailed sectional view of a portion of a digester chamber with one of the agitating means disposed therein and illustrating the delivery and discharge conveyors associated therewith, the view being taken on plane 5—5 of FIG. 2;

FIGURE 6 is a detailed vertical sectional view showing the center mounting post for a digester chamber which also serves as a means for supporting one end of the rotating agitating means; and FIGURE 7 is a plan view of one of the digester chambers with a portion thereof being broken away in the interest of clarity.

Figure 1:
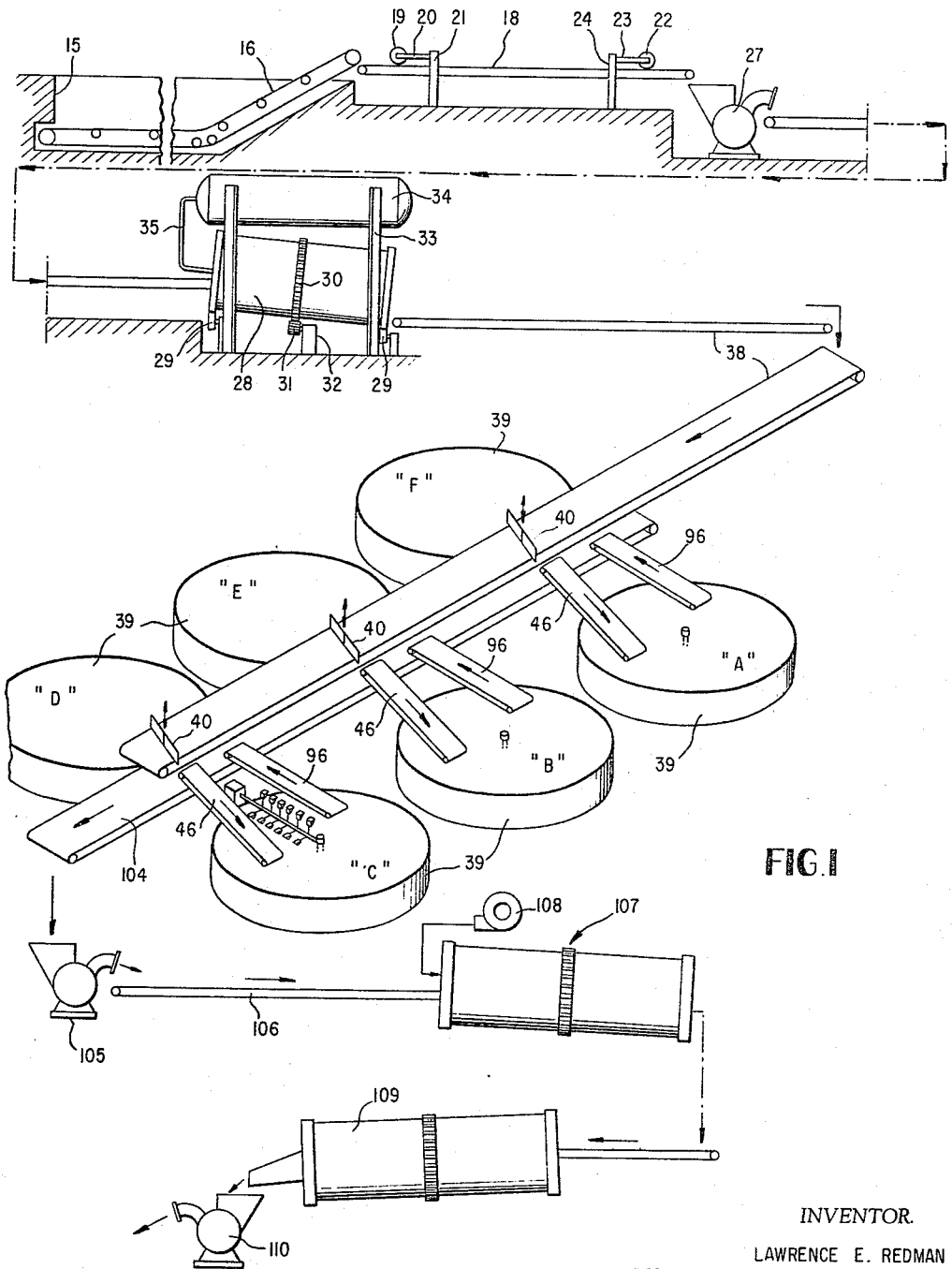
FIGURE 1 is a schematic flow chart illustrating the present invention.

Referring to the drawings, there is shown in FIGURE 1 a hopper or pit 15 into which the collection trucks discharge or dump the customary municipal refuse and waste products that are then moved by a conventional conveyor 16 to a picking and separating station. The picking station is provided with a slow moving conveyor 18 so that a number of operators positioned along the sides of the conveyor will be able to sort and remove from the refuse and waste products any and all salvagable items. In order to facilitate the work of said operators, a metering drum 19 that is rotatably carried by arms 20, which in turn are pivotally mounted upon vertical supports 21, is positioned adjacent the upper surface of the conveyor 18. The metering drum 19 controls the flow or passage of the municipal refuse and waste products over and along the conveyor 18 at a uniform rate so that the operators will have sufficient time in which to remove the various salvageable items. The pivotal mounting of the metering drum on the supports 21 by means of the arms 20 enables the drum to be elevated with respect to the conveyor whereby large and bulky items may be moved by the conveyor 18.

The conveyor 18 has a magnetic picking drum 22 positioned adjacent its discharge end for removing various metallic items from said waste material that might have been overlooked by the operators positioned at the picking stations. The magnetic drum 22 is carried by suitable arms 23 which in turn are pivotally mounted upon vertical supports 24 to enable the drum to have a vertical movement with respect to the conveyor 18 in order to enable the passage of large and bulky items therebeneath. The magnetic drum 22 has associated therewith a scraping member, not shown, for removing any and all items adhering to the peripheral surface of the drum and to deliver said items to a suitable receptacle position adjacent the conveyor 18. The material to be composted is discharged from the conveyor 18 into a grinder 27 where said material is ground to produce particles of substantially uniform size.

The ground waste material is then conveyed or delivered to an elongated rotary mixing drum 28 which is of cylindrical configuration and supported at each end on suitable roller bearings 29. The drum 28 has its longitudinal axis slightly inclined with respect to the horizontal so that the entry end of the drum is higher than the discharge end whereby the material to be composted will have, to a certain degree, a gravity flow through said drum. An annular gear 30 is secured to the peripheral surface of said drum and is engaged by a pinion 31 that is rotatably driven by a suitable motor and gear reduction unit 32. Thus, upon the rotation of the drum 28 by the gears 30 and 31, the waste material to be composted will become thoroughly mixed as it is moved from the entry to the discharge end of said drum. The mixing drum 28 has positioned adjacent thereto on suitable supports 33 a water storage tank 34, which is provided with a thermostatically controlled heating unit, not shown, for maintaining the water within said tank at a particular temperature at all times. The water storage tank 34 is provided with a conduit 35 at one end thereof which terminates in a suitable nozzle, not shown, within the entry end of the mixing drum 28. The water from the tank 34 may be delivered to the drum 28 by gravity flow through the conduit 35 or a suitable pump, not shown, may be employed for delivering the water to the nozzle of the pipe 35 under pressure. Thus, by spraying the ground waste material as it enters the mixing drum 28 with heated water from the tank 34, the temperature of the waste material to be composted will be raised or elevated which will initiate or start the fermentation process thereof. The mixing drum 28 is provided on its inner surface with radially projecting blades or arms, not shown, which are adapted to engage the ground waste material that has been moistened to insure that said material is thoroughly mixed while it is being moved through the drum 28 from the entry end to the discharge end thereof. The moistened ground waste material, which is in the initial stages of fermentation, is discharged from the drum 28 onto an endless conveyor 38 which is adapted to deliver said waste material to digester chambers or tanks 39.

As shown in FIGURE 1, there are six digester chambers, tanks, or vats 39 which are adapted to receive from the conveyor 38 the ground waste material that is to be composted. It has been found that six digester tanks or vats are capable of handling a normal week's collection of municipal refuse and waste products so that the material that is processed in the course of one day's operation would be delivered to the digester tank or vat designated "A" where it would be allowed to remain for a six-day period, and thus, the second day's collection of municipal refuse and waste products would be delivered to the digester tank or vat "B" where it would be allowed to remain for a six-day period. Thus, on the sixth day of a weekly collection period, the municipal refuse and waste material that is collected and processed during the course of that day would be delivered to the digester tank or vat "F;" and at the time that the material was being delivered to this digester vat or tank, the material delivered to the digester tank "A" would have been subjected to a six-day fermentation process and would now be regarded as composted material and thus ready for removal from the digester tank "A." Thus, during the following week's cycle of operation, a digester tank would be loaded or filled with ground and thoroughly mixed and moistened waste material while at the same time, one of the digester tanks would be emptied of the composted material contained therein, so that at all times, there would be a loading and an unloading of two digester tanks. The arrangement of the several digester tanks as shown in FIGURE 1 is by way of illustration only as the site and terrain contour may dictate other arrangements of the digester tanks all of which would fall within the purview of the present invention.

The endless conveyor 38 has associated with the top run thereof a plurality of flow guides or divertors 40, which consist of vertically disposed blade elements 41, FIGURE 4, which are carried by rods 42 positioned within fluid cylinders 43. The blade element of each divertor may thus be raised or lowered with respect to the upper surface of the conveyor 38 and in addition may be angularly disposed with respect to the upper run of said conveyor for the purpose of guiding and diverting the ground waste material into the desired digester tank or vat. Thus, one flow guide or divertor will be used in conjunction with oppositely disposed digester tanks or vats 39 due to the fact that at no time will the ground, mixed and moistened waste material be delivered to more than a single digester tank. The loading of one digester tank and the unloading of another tank will in no way interfere with one another as the conveyor 38 is positioned superjacent a conveyor that is employed in the unloading operation of the several digester tanks.

Figure 2:
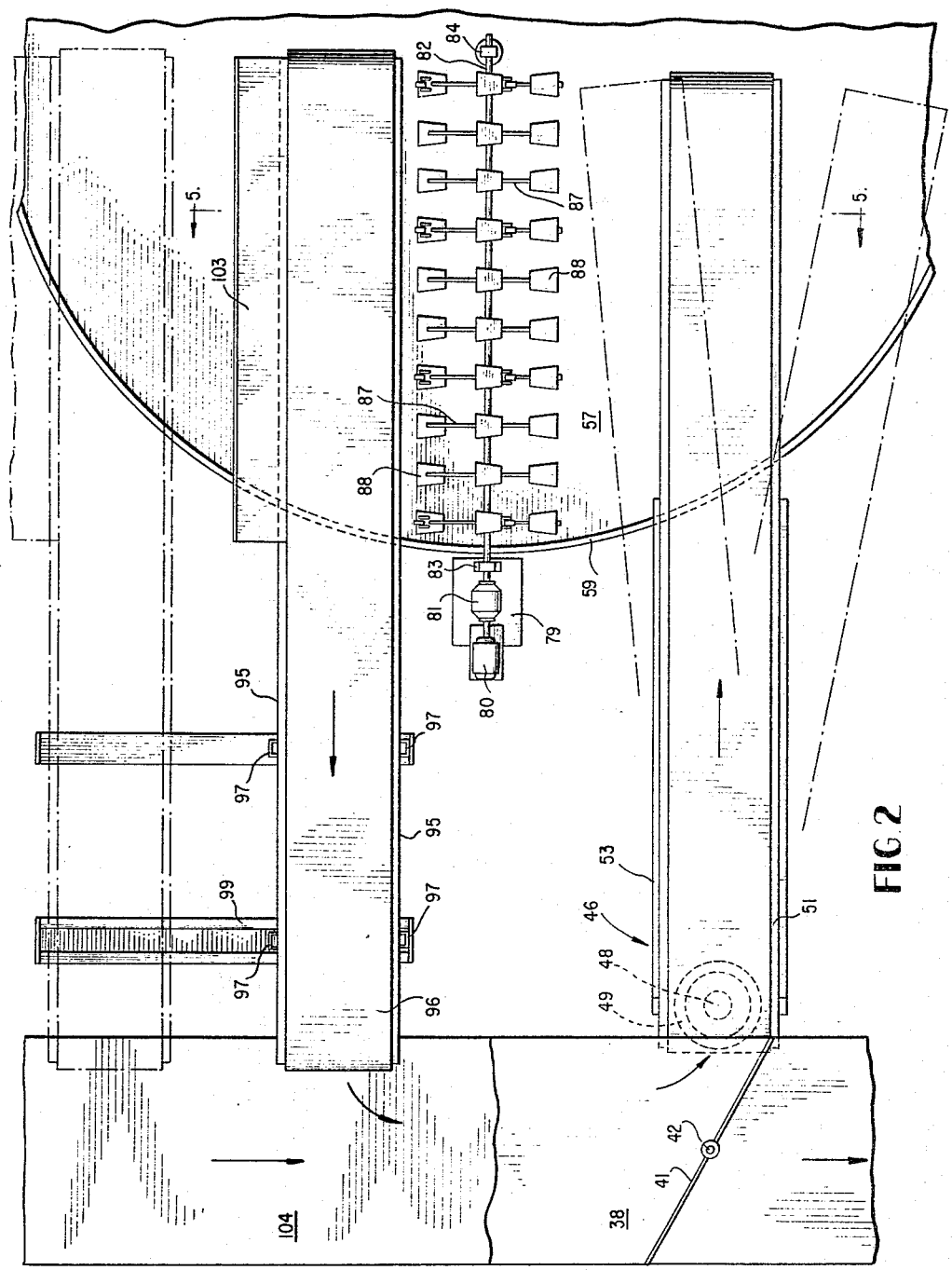
FIGURE 2 is a plan view of a portion of one of the digester chambers showing the loading and unloading conveyors associated therewith.

The several digester tanks or vats "A" through "F" have associated therewith a loading conveyor 46 of the endless type. In FIG. 1, the loading and unloading conveyors associated with digester tanks "D" through "F" have been omitted in the interest of clarity and inasmuch as the loading conveyor 46 is identical for all of the digester tanks, the following will deal with only a single conveyor in conjunction with one of the digester tanks. The conveyor 46, FIGS. 2 and 4 is preferably positioned slightly beneath the top run of the endless conveyor 38 and in close proximity to the flow guide or divertor 40 for the purpose of receiving and delivering to a digester tank 39 the ground waste material to be composted. As shown in FIGS. 2 and 4, one form of mounting or positioning the loading conveyor 46 relative to the conveyor 38 and digester tank 39 includes a pedestal or base element 47 that is provided with a vertically extending pin or rod 48 upon which is rotatably mounted a plate or supporting member 49. The plate 49 and base element 47 may have suitable bearings, not shown, interposed therebetween to facilitate the rotative movement of the supporting member 49 with respect to said base element. The plate or supporting member 49 has mounted thereon a pair of vertically extending suporting columns 50, which are disposed in spaced parallel relation to one another and are connected at their free upper ends to inclined arms 51. The arms 51 are adapted to carry at their respective ends suitable rollers 52, FIG. 5, over which the endless belt of the conveyor 46 is entrained. The supporting columns 50 and arms 51 are maintained in proper relationship to one another by a brace 53 which has one end secured to the arms 51 at approximately its central portion and the other end to the columns 50 upon the member 49. In addition, a second brace 54 is interposed between and secured to the upper ends of the columns 50 and the brace 53 so that the arms 51 and conveyor 46 are supported at all times in proper relationship to the conveyor 38. The columns 50 being secured to and carried by the plate 49 that is rotatably mounted upon the base element 47 one end of the conveyor 46 is capable of being pivoted about the pin 48 on the base element 47. The pivotal movement of the conveyor 46 will permit the free end of said conveyor to be moved through an arcuate path in a horizontal plane superjacent the digester tank 39, as shown in full and dotted lines of FIG. 2. This movement permits a more uniform distribution of the waste material within the digester tank 39 during the loading thereof and thus prevents the waste material from piling or mounding within certain areas in the digester tank.

The digester tanks or vats 39, FIGURES 3 and 4, are of circular configuration and preferably formed from any suitable metal that is not susceptable to corrosion or rust with the size of the tanks ranging anywhere up to a 100 feet in diameter. The several digester tanks "A" through "F" are identical in all respects as regards their construction, mounting, and rotation, as well as the agitators associated therewith so the present description will be restricted to a single digester tank. The metallic bottom plate member 57 of the digester tank 39 has projecting through the center thereof a vertically extending hollow sleeve member 58, which has its medial portion secured to said plate member by any suitable means, such as welding, so as to become a part of said tank. A vertically extending annular wall 59 is secured to the outer peripheral edge of the bottom 57 while a plurality of supporting members 60 are secured to the lower or outer face of the bottom 57 by any suitable means, such as welding. The supporting members 60 radiate outwardly from the hollow sleeve member 58 in a spoke like pattern and terminate at the edge of the annular wall 59. The supporting members 60 are each provided with a plurality of annularly spaced depending webs 61, each of which termiates in a bearing housing 62 for rotatably supporting an axle and wheel assembly, or rollers, 63, FIG. 3. An angularly disposed bracing member 64 is secured to the bearing housing 62 and to the supporting member 60 to retain said bearing housing and wheel assembly in proper position with respect to said supporting member.

The hollow sleeve member 58 has projecting therethrough a post or column 67, FIGURE 6, which has its lowermost end firmly anchored within a concrete base member 68 that is embedded within the ground, and thus constitutes a vertically extending support mounted on said base member. The topmost surface of the base member 68 has supported thereon a plate 69 that is affixed to and carried by the post 67. The plate 69 constitutes a support for an annular flange or collar 70 that is provided on the lower or bottommost end of the hollow sleeve member 58. The co-acting faces of the plate 69 and flange 70 may be provided with a suitable lubricant or roller bearings, not shown, to facilitate the rotative movement of the hollow sleeve 58 and flange 70 with respect to the post 67, plate 69 and base member 68. As shown in FIGURES 3 and 7, the digester tank 39 is provided with a plurality of annular concrete footings 71, that are disposed in spaced relation to one another and to the base member 68, with suitable tracks 72 being mounted on said footings for engaging the wheel assemblies 63 to not only support the digester tank 39 but also to facilitate its rotative movement.

The digester tank 39 has mounted on the outermost end portions of the supporting member 60 a suitable heavy friction type of material, such as a heavy belting 74, which is engaged by a pair of tires 75 mounted upon conventional vehicle wheels, not shown. The wheel and tires, FIG. 3, are rotatably driven by a motor 76 and a gear reduction unit 77, which are mounted upon a suitable base 78 that is embedded within the ground. Thus, upon energization of the motor 76, the wheel and tire assembly 75 will be rotatably driven and through their engagement with the heavy friction type material 74 will rotate the digester tank 39 about the supporting post or column 67 and base 68 with the wheel and axle assemblies 63 moving over the annular tracks 72. While only one driving means has been shown in the drawings of the present application, it is readily apparent that a plurality of said driving means may be disposed at spaced points beneath the various digester tanks 39 to facilitate the rotative movement of said tanks.

The digester tank or vat 39 has disposed externally thereof but in close proximity thereto a base member 79, FIGURES 2 and 3, upon which is mounted a motor 80 having a gear reduction unit 81 associated therewith. The gear reduction unit 81 has a drive shaft, or hollow tubular member, 82 projecting therefrom with the outer end of the drive shaft being rotatably supported within a bearing housing 84 carried by the uppermost end of the supporting post or column 67, FIGURE 6. A second bearing housing 83 is mounted on the base member 79 adjacent the gear reduction unit for also rotatably supporting the drive shaft 82. The supporting post 67 and base member 79 are of sufficient height that the drive shaft 82 will be positioned superjacent the digester tank 39 so that the drive shaft 82 will rotate independent of the movement of the digester tank 39 and yet said tank is able to rotate upon the tracks 72 while moving beneath the rotatable drive shaft 82. The drive shaft 82 has mounted thereon by any suitable means, such as welding, a plurality of groups of radiating arms 87, FIG. 5, with each arm having secured to the free or outer end thereof a scoop 88. A group of radiating arms 87 includes a plurality of arms that are disposed within a common vertical plane that is normal to the axis of the drive shaft 82 and wherein the inner ends of said arms are secured to and are equally spaced from one another about the periphery of said drive shaft. The forward or leading edge of each scoop may be formed with a plurality of serrations or teeth 89, FIGURE 6, while the rearmost face of each scoop 88, adjacent the outermost end of the arm 87, may have a suitable roller 90 mounted thereon which is adapted to facilitate the movement of the scoop over the bottom 57 of the digester tank or vat 39. The portion of the drive shaft 82, which overlies the digester tank 39 between the center post or column 67 and the annular wall 59 of the tank, is provided with with a plurality of groups of arms and scoops 87 and 88 respectively, with each group being so mounted on the drive shaft 82 as to be equally spaced from the next adjacent group of arms and scoops. Thus, as the shaft 82 is driven by the motor 80 and gear reduction 81, the arms 87 and scoops 88 will be rotated so as to engage and mix and stir the material to be composted within the digester tank 39 for the purpose of agitating and aerating said material to facilitate the fermentation thereof. The drive shaft 82 is provided with a plurality of spaced orifices 91, FIGURE 6, which are adapted to discharge in a spray pattern water delivered to the drive shaft by a conduit 92. The conduit may be provided with a thermostatically actuated valve, not shown, for controlling the delivery of water to the shaft 82 and the subsequent spraying or wetting of the material in the digester tank.

An unloading or discharge conveyor 96, FIGURES 1 and 2, is provided for each of the digester tanks or vats "A" through "F" and inasmuch as the conveyors are identical in every instance as regards structure and mode of operation the following description will be limited to a single conveyor. The conveyor includes a pair of arms 95 that are disposed in space parallel relation to one another and which carry at their respective ends rollers, not shown, about which the endless conveyor belt 96 is entrained. The arms 95, adjacent one end thereof are provided with a pair of spaced depending supporting members 97 that have mounted in their lower most ends a roller and axle assembly 98, FIGURE 4. The roller and axle assemblies 98 are mounted within a horizontally disposed trackway 99 that are in turn mounted on and carried by vertical supports 100 which are secured to suitable base members 101. As shown in FIGURE 2, the discharge or unloading conveyor 96 is disposed in substantially horizontal plane with respect to the digester tank or vat 39 with the innermost end of the conveyor being mounted on the supports 100 and the outermost or free end of the conveyor extending over the top of the digester tank in plane parallel to but slightly above the drive shaft 82. The free or outermost end of the conveyor 96 has mounted on one of the side arms 95 an upwardly extending baffle board 103 which is disposed at a slight inclination with respect to the top of said conveyor. The baffle board 103 is of a length approximately equal to the length of the drive shaft 82 between the bearing supports 83 and 84 so that the baffle board overlaps the rotating arms 87 and scoops 88. This arrangement of the baffle board 103 on the conveyor 96 permits the arms 87 and scoops 88 to effect the unloading of the composted material from the digester tank or vat 39 onto the conveyor 96.

When the waste material within the digester tank 39 has been subjected to bacterial action for a period of approximately six days the fermentation of said material has, due to its being stirred and agitated and aerated by the arms 87 and scoops 88 in conjunction with the wetting thereof during this period of time, resulted in said material being sufficiently composted so as to have obtained the status of a salable or finished product. Upon reaching this state or condition, the composted material must be removed from the digester tank 39 and this is accomplished by moving the conveyor 96 on the trackways 99 so as to position said conveyor adjacent the arms 87 and scoops 88 as shown in FIGURES 2 and 5 as being moved from the dotted line to the full line position. The agitating arms 87 and scoops 88 are rotated by the drive shaft 82 at a sufficient rate of speed so that the composted material can be collected or gathered in the scoops 88 and upon the rotative movement of the arms 87 deposited upon the uppermost run of the material upon the conveyor 96. The baffle board 103 functions as a stop member for the material being deposited upon the conveyor 96 by the scoops 88 so as to insure that all of the material is deposited upon the conveyor and none is thrown over the conveyor. The composted material contained within the digester tank 39 has, through the fermentation thereof, been reduced to a condition of where its weight is materially less than it was during initial stages of fermentation and due to this substantial decrease in weight, the scoops 88 are capable of collecting the composted material and depositing same by throwing it upon the discharge conveyor 96. Furthermore, by increasing the rotative speed of the drive shaft 82 through the gear reduction unit 81, the movement of the scoops 88 in their arcuate path of travel will, of course, be increased thereby greatly aiding and facilitating the gathering and depositing of the composted material upon the discharge conveyor. If during the unloading or discharging operation, the digester tank 39 is maintained in a substantially stationary condition, it will be necessary, of course, to rotate or advance said digester tank in somewhat of an indexing manner so as to continually present to the scoops 88 a sufficient quantity of composted material for delivery to the discharge conveyor 96.

The conveyors 96 for each of the digester tanks "A" through "F" deliver the composted material to an endless conveyor 104 that is positioned subjacent the conveyor 38, FIGURES 1 and 4, and which delivers the composted material to a grinder 105. The composted material is discharged from the grinder 105 onto the conveyor 106 where it is delivered to an elongated drum type dryer 107, which is mounted for rotatable movement in much the same manner as the mixing drum 28. The dryer 107 has disposed therein thermostatically controlled heating means, not shown, to which air is delivered by a blower 108, so that the composted material will move through a mass of heated air in the dryer 107 for the purpose of removing any moisture that might still be contained within and carried by the composted material. The composted material is discharged from the dryer 107 and delivered to a rotatable drum 109 where said material is thoroughly agitated and vibrated prior to its being delivered to a grinder 110 where the material is subjected to another grinding operation, after which it may be collected or bagged as a finished and salable product.

In carrying out the process of the present invention, the refuse and waste material to be composted is delivered by the conveyor 18 from the picking station to the grinder 27 and then to the mixing drum 28 where it s subjected to a thorough agitation and mixing while being moistened so that as the waste material is discharged from the drum onto the conveyor 38, it will be in the initial stage of fermentation. The material to be composted will be moved by the conveyor 38 into position for delivery to one of the digester tanks or vats "A" through "F" by one of the loading conveyors 46, which, due to its pivotal mounting on the base or pedestal element 47 will permit the free end of the conveyor to be moved in a substantially arcuate path to insure a proper and even distribution of the material within the digester tank or vat 39.

The material to be composted will remain in a digester tank or vat 39 for a period of approximately six days and during this time, it will be subjected to a fermentation process. In order that all of the material will be subjected to a fermentation process, the digester tanks or vats 39 will be slowly rotated by the drive mechanism 75–76; and at the same time, the drive shaft 82 with the arms 87 and scoops 88 carried thereby will be slowly rotated by the motor 80 and gear reduction unit 81 in a direction contrary to the path of movement of the digester tank 39. The counter rotative movement of the arms 87 and scoops 88 will cause said arms and scoops to move through the material in the digester tank for the purpose of agitating and stirring up said material and said agitating or stirring up of the material will take the form of the arms 87 and scoops 88 collecting and lifting the material and moving it through an arcuate path as the drive shaft 82 rotates in the bearing housings 83 and 84. Thus, the counter rotative movement of the digester tank 39 and scoops 88 will result in a thorough mixing, stirring, and agitating of the material within said digester tank; and at the same time, water may be delivered to the drive shaft 82 by means of the conduit 92 for the purpose of continually moistening said material as it is being stirred and agitated. Such an action tends to aid and abet the fermentation of the material to be composted.

During the period that the waste material remains within the digester tank and is subjected to a fermentation process, the discharge conveyor 96 is maintained at one side of the digester tank 39 or in the position as indicated in dotted lines in FIGURE 2. Upon the completion of the fermentation process, the material is then ready to be discharged from the digester tank or vat 39; and at this time, the conveyor 96 is moved on the trackways 99 from the dotted line to the full line position of FIGURE 2, so that the material may be elevated from said digester tank and deposited upon the upper run of the discharge conveyor 96 by the scoops 88. This operation of depositing the composted material upon the discharge conveyor 96 is facilitated by the use of the baffle board 103 in conjunction with said conveyor and the discharge conveyor then delivers the composted material to the conveyor 104 from whence it is delivered to suitable grinders and dryers in order to obtain a saleable composted product.

During the unloading of the digester tank 39, it may be deemed more advantageous to have the digester tank 39 continuously rotating rather than having said tank remain in a stationary position during portions of the unloading and then indexing or intermittently moving the digester tank to properly position the composted material into position for engagement by the scoops 88. The slow rotative movement of the digester tank 39 may be at such a speed that the scoops 88 will be able to carry out the unloading operation during the continued slow rotative movement of the digester tank 39.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as claimed herein.

I claim:

1. Apparatus for making compost from decomposable organic and inorganic material comprising a base member, a vertically extending support mounted thereon, a plurality of circular tracks arranged in concentric relationship with said base and support, a container rotatably mounted upon said support, a plurality of rollers provided on said container engageable with said tracks for supporting said container, means for delivering thoroughly mixed, ground and moisture-ladened material to said container, driving means engaging said container for rotating said container and material on said tracks about said support, a hollow tubular member positioned above said container, said tubular member having one end rotatably mounted on said support and the other end connected to a source of power positioned externally of and adjacent to said container for rotating said tubular member contrariwise to the direction of rotation of the container, a plurality of radially projecting agitating members secured to said tubular member in spaced relation to one another for engaging the material in said container, said tubular member having a plurality of orifices provided therein intermediate the agitating members, a conduit connected to the end of said tubular member mounted on said support for delivering a treating fluid to said material and means for discharging the treated material.

2. Apparatus for making compost from decomposable organic and inorganic material comprising a support, an open topped container rotatably mounted upon said support in concentric relation therewith, means for delivering thoroughly mixed, ground and moisture ladened material to said container, means for rotating said container about said support, a tubular member positioned above said container in a plane normal to the axis of rotation of said container, said tubular member having an end mounted upon said support, drive means positioned externally of said container and connected to the other end of said tubular member for rotating same in a direction opposite to the direction of rotation of said container, a plurality of radially projecting members mounted on said tubular member, said radially projecting members moving through said material in a circular path upon the rotation of said tubular member for engaging and agitating said material.

3. Apparatus as set forth in claim 2 wherein said tubular member is formed with a plurality of orifices intermediate said radially projecting members and means for delivering a material treating fluid to said tubular member.

4. Apparatus as set forth in claim 2 wherein said radially projecting members are arranged in groups circumferentially of said tubular member with said groups being spaced from one another throughout substantially the length of said tubular member.

5. Apparatus as set forth in claim 4 wherein said radially projecting members are provided with scoops on the outer ends thereof.

6. Apparatus for making compost from decomposable organic and inorganic material comprising a vertically extending support, a container rotatably mounted upon said support in concentric relation therewith, means for rotating said container about said support, a tubular member positioned above said container in a plane normal to the axis of rotation of said container, said tubular member having an end mounted upon said support, drive means positioned externally of said container and connected to the other end of said tubular member for rotating same in a direction opposite to the direction of rotation of said container, means for delivering organic and inorganic waste material to said container including an endless conveyor positioned above said container, said conveyor having one end pivotally mounted upon a base member positioned externally of said container with the other end of the conveyor moving through an arcuate path above said container to uniformly distribute the material within said container, a plurality of radially projecting members mounted on said tubular member and moving through said material in a circular path upon the rotation of said tubular member and container for engaging and agitating said material.

7. Apparatus for making compost from decomposable organic and inorganic material comprising a vertically extending support, a container rotatably mounted upon said support in concentric relation therewith, means for rotating said container about said support, a tubular member positioned above said container in a plane normal to the axis of rotation of said container, said tubular member having an end mounted upon said support, drive means positioned externally of said container and connected to the other end of said tubular member for rotating same in a direction opposite to the direction of rotation of said container; means for delivering organic and inorganic waste material to said container including an endless conveyor positioned above said container, said conveyor having an end pivotally mounted upon a base member positioned externally of said container with the other end of the conveyor moving through an arcuate path above said container to uniformly distribute the material within said container, a plurality of radially projecting members mounted on said tubular member and moving through said material in a circular path upon the rotation of said tubular member and container for engaging and agitating said material and means for receiving and delivering said material from said container including an endless discharge conveyor positioned superjacent said container, said discharge conveyor being slidably mounted upon trackways positioned externally of said container for moving said discharge conveyor into close proximity to the path of movement of said radially projecting members for receiving said material from said members.

8. Apparatus as set forth in claim 7 wherein said discharge conveyor is provided with means for receiving said material from said radially projecting members and directing same onto said conveyor.

(References on following page)

References Cited by the Examiner

UNITED STATES PATENTS

| | | | |
|---|---|---|---|
| 2,049,889 | 8/1936 | Boniface | 71—9 |
| 2,178,818 | 11/1939 | Earp-Thomas | 71—9 X |
| 2,213,056 | 8/1940 | Skoog et al. | 18—1 X |
| 2,285,834 | 6/1942 | Proctor | 71—9 |
| 2,639,902 | 5/1953 | Kuebler | 71—9 X |
| 2,734,803 | 2/1956 | Ruskin et al. | 23—259.1 |
| 2,915,300 | 12/1959 | Fischer | 259—85 X |
| 2,929,688 | 3/1960 | Riker et al. | 23—259.1 |
| 3,114,622 | 12/1963 | Hardy | 23—259.1 X |

FOREIGN PATENTS 418,780  12/1910  France.

MORRIS O. WOLK, *Primary Examiner.*

ANTHONY SCIAMANNA, DELBERT E. GANTZ,
*Examiners.*

R. M. REESE, *Assistant Examiner.*